No. 608,806. Patented Aug. 9, 1898.
W. J. THOMPSON.
STEAM COOKER.
(Application filed Nov. 18, 1897.)
(No Model.)
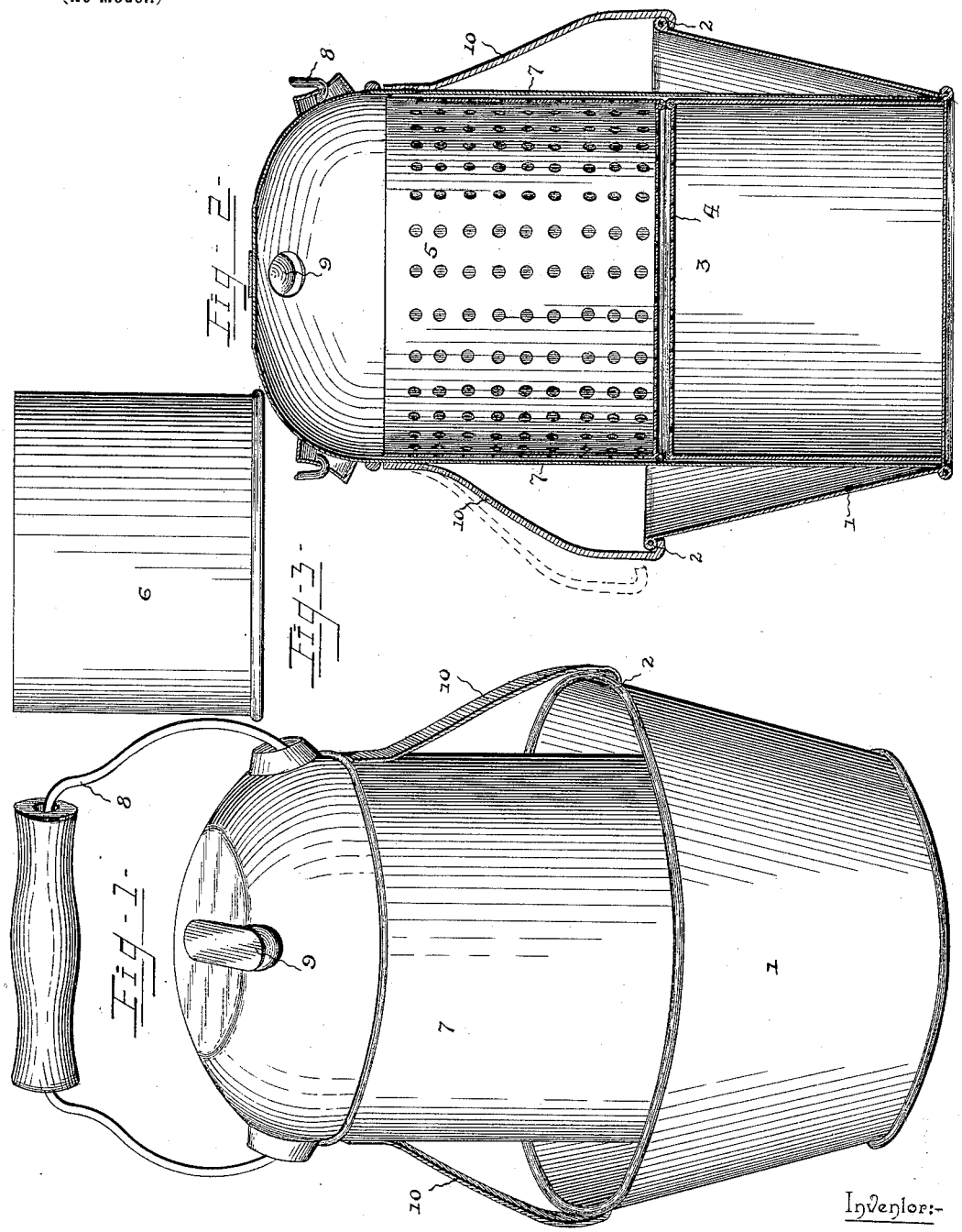
Witnesses
C. J. Young.
V. B. Hillyard.
Inventor:-
William J. Thompson,
By his Attorneys,
C. A. Snow & Co.

UNITED STATES PATENT OFFICE.

WILLIAM J. THOMPSON, OF HAW RIVER, NORTH CAROLINA.

STEAM-COOKER.

SPECIFICATION forming part of Letters Patent No. 608,806, dated August 9, 1898.

Application filed November 18, 1897. Serial No. 658,975. (No model.)

*To all whom it may concern:*

Be it known that I, WILLIAM J. THOMPSON, a citizen of the United States, residing at Haw River, in the county of Alamance and State of North Carolina, have invented a new and useful Steam-Cooker, of which the following is a specification.

This invention relates to means for cooking food and canning fruit by means of steam and is, properly speaking, a combined steam cooker and canner.

The principal object is to combine the parts so that they may be readily separated for cleaning and to enable food being placed in position for cooking and to provide for a small amount of water, which can be more quickly converted into steam, thereby enabling the operation to be performed in a comparatively short interval of time.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a steam canner and cooker constructed in accordance with this invention. Fig. 2 is a vertical central section thereof, the dotted lines showing a spring-hook disengaged from the boiler or generator. Fig. 3 is a detail view of a vessel for holding meat, vegetables, and like food.

Corresponding and like parts are referred to in the following description and indicated in the several views of the drawings by the same reference characters.

The boiler or generator 1 is a pan having its sides upwardly flaring and provided at their upper edges with a bead or outwardly-extending lip 2. This boiler or generator may be of any desired form, and, as shown, is circular, and is adapted to be placed upon a stove or other heater for raising the water to the boiling-point for converting it into steam. A stand 3 is placed within the boiler or generator, and its top 4 is perforated for the escape of steam and comes slightly below the upper edge of the boiler or generator. This stand supports the vessel, cans, or utensil containing the food to be cooked or article to be steamed. When canning fruit, the cans or jars are placed upon the perforate top 4 of the stand, and when it is required to steam vegetables or other articles of food the same is placed in a colander 5; but for boiling the article of food is placed in a vessel 6. A cover 7 incloses the stand 3 and the cans, jars, colander, or vessel placed thereon and containing the article of food to be cooked or steamed. This cover is provided with a handle 8 and a safety-valve 9 for letting off steam to obviate dangerous pressure and is provided at its sides with spring-hooks 10 to engage at their lower ends with the bead or lip 2, so as to retain the cover in place and prevent it being lifted by the confined steam. These spring-hooks are firmly attached at their upper ends to the sides of the cover at diametrically opposite points and are downwardly divergent, and their lower ends are bent inward, so as to make firm engagement with the bead or lip 2.

By having the boiler or generator flaring the level of the water is at all times under observation from any point, and the pan can be replenished at any time and from any point without requiring the use of a funnel or like device.

Having thus described the invention, what is claimed as new is—

A steam cooker and canner, comprising a boiler or generator having its sides upwardly flaring, a hollow stand removably fitted within the boiler or generator and provided with imperforate vertical sides resting upon the bottom thereof, said stand having a perforated top arranged in a plane near the upper edges of the boiler or generator and adapted to receive the food, or receptacle containing the food, to be steamed or cooked, a cover inclosing the stand and vessel and resting upon the bottom of the boiler or generator, the oppositely-disposed spring-hooks secured to the cover and extending downward and engaging the boiler or generator at the upper edge thereof, and a bail connected with the cover and serving as a handle for carrying the same and also the entire device, substantially as described.

In testimony that I claim the foregoing as my own I have hereto affixed my signature in the presence of two witnesses.

WILLIAM J. THOMPSON.

Witnesses:
JAMES M. MAY,
EDWIN D. THOMPSON.